United States Patent [19]
Chang et al.

[11] Patent Number: 5,734,290
[45] Date of Patent: Mar. 31, 1998

[54] CHARGE PUMPING CIRCUIT HAVING CASCADED STAGES RECEIVING TWO CLOCK SIGNALS

[75] Inventors: Kuen-Long Chang; Jieh-Tsorng Wu, both of Taipei, Taiwan

[73] Assignee: National Science Council of R.O.C., Taiwan

[21] Appl. No.: 616,882

[22] Filed: Mar. 15, 1996

[51] Int. Cl.⁶ ........................................ G05F 1/10
[52] U.S. Cl. ................................. 327/536; 327/537
[58] Field of Search ........................ 327/536, 537, 327/589, 538, 543, 541

[56] References Cited

U.S. PATENT DOCUMENTS

| | | | |
|---|---|---|---|
| 4,935,644 | 6/1990 | Tsujimoto | 327/563 |
| 5,043,858 | 8/1991 | Watanabe | 327/536 |
| 5,140,182 | 8/1992 | Ichimura | 327/536 |

Primary Examiner—Timothy P. Callahan
Assistant Examiner—Jung Ho Kim
Attorney, Agent, or Firm—Fish & Richardson P.C.

[57] ABSTRACT

A charge pumping circuit includes a plurality of cascaded voltage gain circuit stages. Each circuit stage has an switching transistor with a source connected electrically to a drain of the transistor of an immediately succeeding one of the circuit stages, and a gate connected electrically to the source of the transistor of the immediately succeeding one of the circuit stages, and a capacitor. The capacitor of odd ones of the circuit stages is connected electrically across a first clock and the source of the transistor of the respective circuit stage. The capacitor of even ones of the circuit stages is connected electrically across a second clock, which is out of phase with the first clock, and the source of the transistor of the respective circuit stage. An output transistor has a drain connected electrically to the source of the transistor of a last voltage gain circuit stage, a source serving as an output terminal of the charge pumping circuit, and a gate connected electrically to the drain of the output transistor. An output capacitor is connected electrically across the source of the output transistor and the first clock when the total number of the voltage gain circuit stages is an even number and across the source of the output transistor and the second clock when the total number of the voltage gain circuit stages is an odd number.

8 Claims, 10 Drawing Sheets

CHARGE PUMPING CIRCUIT HAVING CASCADED STAGES RECEIVING TWO CLOCK SIGNALS

BACKGROUND OF THE INVENTION

1. Field of the Invention

This invention relates to a charge pumping circuit, more particularly to a charge pumping circuit which is capable of generating a relatively high voltage for low power circuits.

2. Description of the Related Art

Charge pumping circuits have been applied in electrically erasable programmable read only memories (EEPROM) for many years. In view of recent developments in low voltage circuit design, the charge pumping circuit is once again in use in low voltage circuits.

Presently, low voltage and low power consumption are the most important demands in circuit design. When the voltage of a power source drops to a predetermined level, MOS transistors which serve as switching devices in a circuit will not be fully turned on, thereby resulting in improper operation of the circuit. A charge pumping circuit is thus needed to solve this problem.

Figure 1:
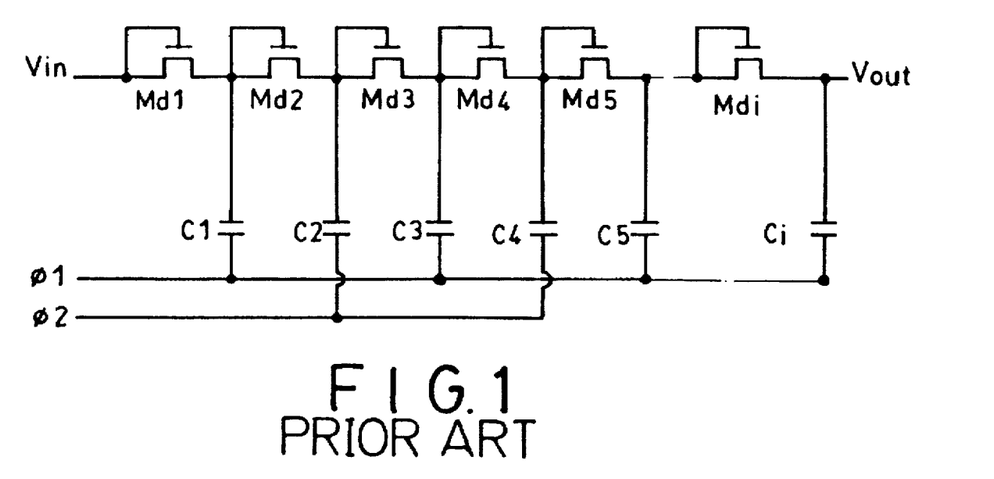
FIG. 1 is a schematic circuit diagram of a conventional charge pumping circuit.

Referring to FIG. 1, a conventional charge pumping circuit is shown. The conventional charge pumping circuit includes a plurality of cascaded voltage gain circuit stages. Each voltage gain circuit stage has a diode-connected transistor (Md1, Md2, . . . , Mdi) with a drain, a source connected electrically to the drain of the diode-connected transistor (Md2, . . . , Mdi) of an immediately succeeding one of the voltage gain circuit stages, and a gate connected electrically to the drain of the diode-connected transistor (Md1, Md2, . . . , Mdi) thereof. The drain of the diode-connected transistor (Md1) of a first one of the voltage gain circuit stages serves as an input terminal of the conventional charge pumping circuit and is connected electrically to a power source (Vin). The source of the diode-connected transistor (Mdi) of a last one of the voltage gain circuit stage serves as an output terminal (Vout) the conventional charge pumping circuit. Each voltage gain circuit stage further includes a capacitor (C1, C2, . . . , Ci). The capacitor (C1, C3, . . . ) of odd ones of the voltage gain circuit stages is connected electrically across a first clock ($\phi 1$) and the source of the diode-connected transistor (Md1, Md3, . . . ) of the respective voltage gain circuit stage. The capacitor (C2, C4, . . . ) of even ones of the-voltage gain circuit stages is connected electrically across a second clock ($\phi 2$) and the source of the diode-connected transistor (Md2, Md4, . . . ) of the respective voltage gain circuit stage. The first and second clocks ($\phi 1$ and $\phi 2$) are out of phase. The capacitor (Ci) of the last one of the voltage gain circuit stages is connected electrically to the first clock ($\phi 1$) when the total number of the voltage gain circuit stages is an odd number and is connected electrically to the second clock ($\phi 2$) when the total number of the voltage gain circuit stages is an even number. The amplitude of each of the clocks ($\phi 1, \phi 2$) is equal to the voltage of the power source (Vin).

Figure 2:
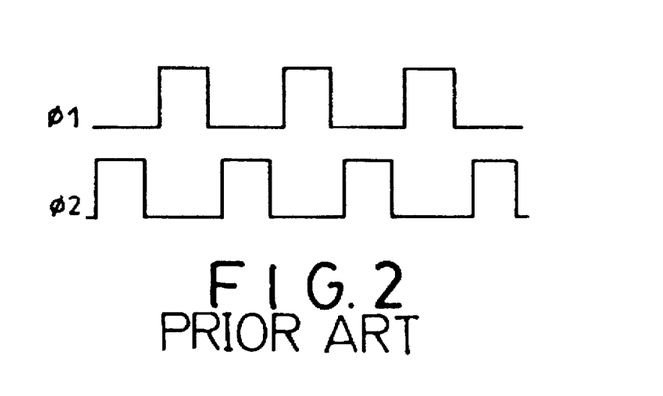
FIG. 2 is a pulse diagram illustrating the clocks used in the conventional charge pumping circuit shown in FIG. 1.

Referring now to FIGS. 1 and 2, when the conventional charge pumping circuit is activated, the capacitor (C1) is charged by the power source (Vin) via the diode-connected transistor (Md1). When the first clock ($\phi 1$) is high and the second clock ($\phi 2$) is low, the odd ones of the voltage gain circuit stages output a higher voltage due to coupling by the capacitor (C1, C3, . . . ) of the odd ones of the voltage gain circuit stages, thereby charging the capacitor (C2, C4, . . . ) of the immediately succeeding one of the voltage gain circuit stages. When the first clock ($\phi 1$) is low and the second clock ($\phi 2$) is high, the even ones of the voltage gain circuit stages output a higher voltage due to coupling by the capacitor (C2, C4, . . . ) of the even ones of the voltage gain circuit stages, thereby charging the capacitor (C1, C3, . . . ) of the immediately succeeding one of the voltage gain circuit stages. It should be appreciated that, since the diode-connected transistor (Md1, Md2, . . . , Mdi) of each of the voltage gain circuit stages is connected as a diode, the source voltage levels of the diode-connected transistors of the latter voltage gain circuit stages become higher and higher so as to result in a considerably serious body effect in order to cause a higher threshold voltage, thereby resulting in lowering of the voltage gain among the latter voltage gain circuit stages. This is especially true in low voltage power source application, for example, 1.2V, where the voltage level to be generated is limited seriously.

Figure 3:
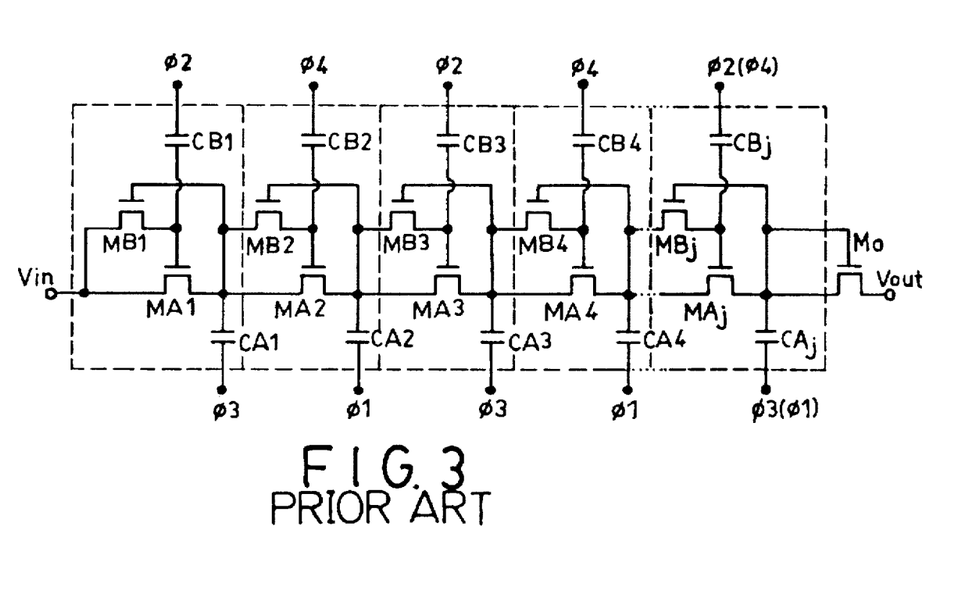
FIG. 3 is a schematic circuit diagram of another conventional charge pumping circuit.
Figure 4:
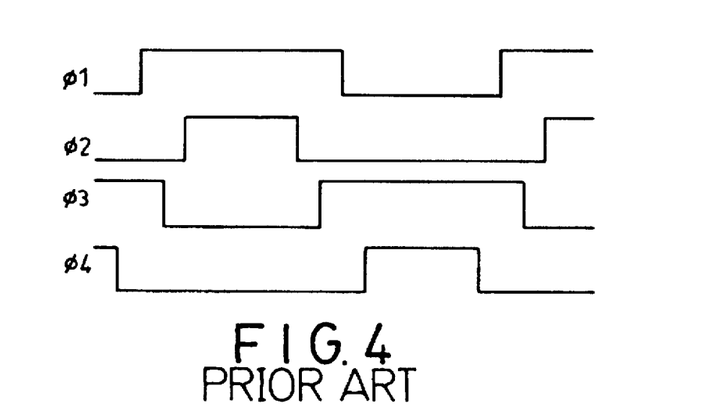
FIG. 4 is a pulse diagram illustrating the clocks used in the conventional charge pumping circuit shown in FIG. 3.

To solve the aforementioned problem, another conventional charge pumping circuit has been proposed. Referring now to FIGS. 3 and 4, the conventional charge pumping circuit includes a plurality of cascaded voltage gain circuit stages. Each voltage gain circuit stage has a first transistor (MA1, MA2, . . . , MAj) and a second transistor (MB1, MB2, . . . , MBj). The first transistor (MA1, MA2, . . . , MAj) of each of the voltage gain circuit stages has a drain, a source connected electrically to the drain of the first transistor (MA2, MA3, . . . , MAj) of an immediately succeeding one of the voltage gain circuit stages, and a gate. The second transistor (MB1, MB2, . . . , MBj) of each of the voltage gain circuit stages has a drain connected electrically to the drain of the first transistor (MA1, MA2, . . . , MAj) of the same voltage gain circuit stage, a source connected electrically to the gate of the first transistor (MA1, MA2, . . . , MAj) of the same voltage gain circuit stage, and a gate connected electrically to the source of the first transistor (MA1, MA2, . . . , MAj) of the same voltage gain circuit stage and to the drain of the second transistor (MB2, MB3, . . . , MBj) of an immediately succeeding one of the voltage gain circuit stages. The drain of the first transistor (MA1) of a first one of the voltage gain circuit stages serves as an input terminal of the conventional charge pumping circuit and is connected to a power source (Vin). Each voltage gain circuit stages further has a first capacitor (CA1, CA2, . . . , CAj) and a second capacitor (CB1, CB2, . . . , CBj). The first capacitor (CA2, CA4, . . . ) of even ones of the voltage gain circuit stages is connected electrically across a first clock ($\phi 1$) and the source of the first transistor (MA2, MA4, . . . ) of the same voltage gain circuit stage. The second capacitor (CB2, CB4, . . . ) of even ones of the voltage gain circuit stages is connected electrically across a fourth clock ($\phi 4$) which is out of phase with the first clock ($\phi 1$) and the source of the second transistor (MB2, MB4, . . . ) of the same voltage gain circuit stage. The first capacitor (CA1, CA3, . . . ) of odd ones of the voltage gain circuit stages is connected electrically across a third clock ($\phi 3$) which is out of phase with the first clock ($\phi 1$) and the source of the first transistor (MA1, MA3, . . . ) of the same voltage gain circuit stage. The second capacitor (CB1, CB3, . . . ) of odd ones of the voltage gain circuit stages is connected electrically across a second clock ($\phi 2$) which is in phase with the first clock ($\phi 1$) and the source of the second transistor (MB1, MB3, . . . ) of the same voltage gain circuit stage.

It should be noted that, since all of the transistors (MA1, MA2, . . . , MAj, and MB1, MB2, . . . , MBj) of the voltage gain circuit stages act as switches, the pulse widths of the clocks ($\phi 1, \phi 2, \phi 3, \phi 4$) are different from each other to compensate for switching action so as to ensure proper operation of the charge pumping circuit, as best shown in FIG. 4.

The conventional charge pumping circuit of FIG. 3 further includes an output circuit stage which has an output transistor (Mo) with a drain connected electrically to the source of the first transistor (MAj) of a last one of the voltage gain circuit stages, a gate connected electrically to the gate of the second transistor (MBj) of the last one of the voltage gain circuit stages, and a source serving as an output terminal (Vout) of the conventional charge pumping circuit.

Referring now to FIGS. 3 and 4, in operation, when the first and third clocks ($\phi1$ and $\phi3$) are high, and when the second and fourth clocks ($\phi2$ and $\phi4$) are low, the second transistor (MB1, MB2, ...) of all of the voltage gain circuit stages are turned on and thus, the high state voltage output from an immediately previous ones of the voltage gain circuit stages charges the second capacitor (CB1, CB2, ...). When the first clock ($\phi1$) is high, and when the second, third and fourth clocks ($\phi2$, $\phi3$ and $\phi4$) are low, the second transistor (MB1, MB3, ...) of odd ones of the voltage gain circuit stages is turned off and thus, the high state voltage stored previously in the second capacitor (CB1, CB3, ...) of odd ones of the voltage gain circuit stages is maintained. When the first and second clocks ($\phi1$ and $\phi2$) are high, and when the third and fourth clocks ($\phi3$ and $\phi4$) are low, the voltage stored previously in the second capacitor (CB1, CB3, ...) of odd ones of the voltage gain circuit stages is coupled to a higher voltage so as to enable the first transistor (MA1, MA3, ...) of odd ones of the voltage gain circuit stages to be turned on and to enable the same voltage gain circuit stage to output a high voltage which is generated by coupling of the voltage provided by the first clock ($\phi1$) with the voltage stored previously in the first capacitor (CA2, CA4, ...) of even ones of the voltage gain circuit stages. When the first clock ($\phi1$) is high, and when the second clock ($\phi2$) becomes low, and when the third and fourth clocks ($\phi3$ and $\phi4$) are low, the first transistor (MA1, MA3, ...) of odd ones of the voltage gain circuit stages is turned off. When the first clock ($\phi1$) is high, when the third clock ($\phi3$) becomes high, and when the second and fourth clocks ($\phi2$ and $\phi4$) are low, the second capacitor (CB1, CB2, ...) of all of the voltage gain circuit stages are turned on again. When the first clock ($\phi1$) becomes low, when the third clock ($\phi3$) is high, and when the second and fourth clocks ($\phi2$ and $\phi4$) are low, the second transistor (MB2, MB4, ...) of even ones of the voltage gain circuit stages are turned off and the high state voltage of the second capacitor (CB2, CB4, ...) of the same is maintained. When the fourth clock ($\phi4$) becomes high, when the third clock ($\phi3$) is high, and when the first and second clocks ($\phi1$ and $\phi2$) are low, voltage stored previously in the second capacitor (CB2, CB4, ...) of even ones of the voltage gain circuit stages is coupled to a higher voltage so as to enable the first transistor (MA2, MA4, ...) of even ones of the voltage gain circuit stages to be turned on and to enable the same voltage gain circuit stage to output a high voltage which is generated by coupling of the voltage provided by the third clock ($\phi3$) with the voltage stored previously in the first capacitor (CA1, CA3, ...) of odd ones of the voltage gain circuit stages. When the fourth clock ($\phi4$) becomes low, when the third clock ($\phi3$) is high, and when the first and second clocks ($\phi1$ and $\phi2$) are low, the first transistor (MA2, MA4, ...) of even ones of the voltage gain circuit stages is turned off. Thereafter, the operation described above is repeated.

Since the transistors (MA1, MA2, ..., MAj and MB1, MB2, ..., MBj) of the conventional charge pumping circuit of FIG. 3 act as switches and not as diodes, the problem that is associated with the conventional charge pumping circuit of FIG. 1 is thus avoided. However, it is necessary to provide four clocks ($\phi1,\phi2,\phi3,\phi4$) for controlling the operations of the different transistors, thereby resulting in a relatively complicated circuit. Furthermore, since the pulse width of the second clock ($\phi2$) is narrower than that of the first clock ($\phi1$), and since the pulse width of the fourth clock ($\phi4$) is narrower than that of the third clock ($\phi3$), the charging time for the corresponding capacitor is shortened, thereby degrading the loading capability of the output current.

SUMMARY OF THE INVENTION

Therefore, the objective of the present invention is to provide a charge pumping circuit which can overcome the problems that are associated with the aforementioned prior art.

According to the present invention, a charge pumping circuit has an input terminal adapted to be connected electrically to a power source, and an output terminal. The charge pumping circuit comprises: a first clock; a second clock, the first and second clocks being out of phase; a plurality of cascaded voltage gain circuit stages, each having an switching transistor which has a drain, a source connected electrically to the drain of the switching transistor of an immediately succeeding one of the voltage gain circuit stages, and a gate connected electrically to the source of the switching transistor of the immediately succeeding one of the voltage gain circuit stages, the drain of the switching transistor of a first one of the voltage gain circuit stages serving as the input terminal of the charge pumping circuit, each of the voltage gain circuit stages further having a capacitor, the capacitor of odd ones of the voltage gain circuit stages being connected electrically across the first clock and the source of the switching transistor of the respective voltage gain circuit stage, the capacitor of even ones of the voltage gain circuit stages being connected electrically across the second clock and the source of the switching transistor of the respective voltage gain circuit stage; and an output circuit stage having an output transistor which has a drain connected electrically to the source of the switching transistor of a last one of the voltage gain circuit stages, a source serving as the output terminal of the charge pumping circuit, and a gate connected electrically to the drain of the output transistor, the output circuit stage further having an output capacitor which is connected electrically across the source of the output transistor and the first clock when the total number of the voltage gain circuit stages is an even number and which is connected electrically across the source of the output transistor and the second clock when the total number of the voltage gain circuit stages is an odd number.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Before the present invention is described in greater detail, it should be noted that like elements are indicated by the same reference numerals throughout the disclosure.

Figure 5:
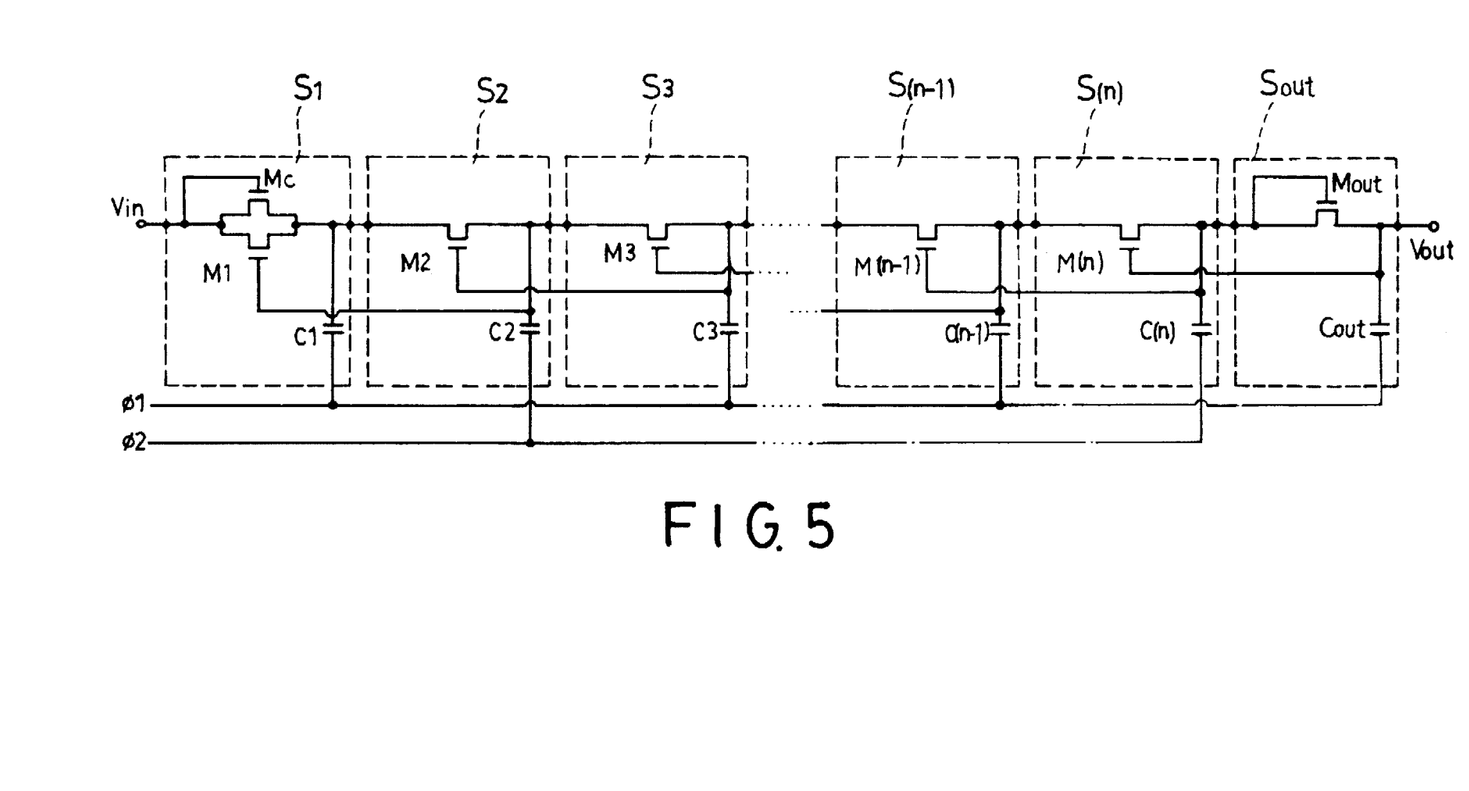
FIG. 5 is a schematic circuit diagram of a first preferred embodiment of a charge pumping circuit according to the present invention.
Figure 6:
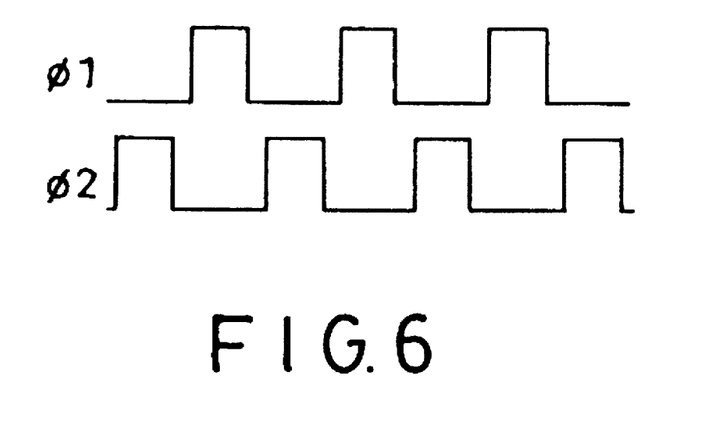
FIG. 6 is a pulse diagram illustrating the clocks used in the first preferred embodiment.

Referring to FIGS. 5 and 6, the first preferred embodiment of a charge pumping circuit according to the present invention includes a first clock ($\phi1$), a second clock ($\phi2$), a plurality of cascaded voltage gain circuit stages (S1, S2, . . . , Sn) and an output circuit stage (Sout).

The first and second clocks ($\phi1$ and $\phi2$) are out of phase. The amplitude of each of the clocks ($\phi1,\phi2$) is equal to the voltage level of a power source (Vin).

Each of the cascaded voltage gain circuit stages (S1, S2, . . . , Sn) has an switching transistor (M1, M2, . . . , Mn) with a drain, a source connected electrically to the drain of the switching transistor (M2, M3, . . . , Mn) of an immediately succeeding one of the voltage gain circuit stages (S2, S3, . . . , Sn), and a gate connected electrically to the source of the switching transistor (M2, M3, . . . , Mn) of the immediately succeeding one of the voltage gain circuit stages (S2, S3, . . . , Sn). The drain of the switching transistor (M1) of a first one (S1) of the voltage gain circuit stages (S1, S2, . . . , Sn) serves as an input terminal of the charge pumping circuit, which is adapted to be connected electrically to the power source (Vin). The first one (S1) of the voltage gain circuit stages (S1, S2, . . . , Sn) further has a control transistor (Mc) with a drain connected electrically to the drain of the switching transistor (M1) thereof, a source connected electrically to the source of the switching transistor (M1) thereof, and a gate connected electrically to the drain of the control transistor (Mc). Each of the voltage gain circuit stages (S1, S2, . . . , Sn) further has a capacitor (C1, C2, . . . Cn). The capacitor (C1, C3, . . . ) of odd ones (S1, S3, . . . ) of the voltage gain circuit stages (S1, S2, . . . , Sn) is connected electrically across the first clock ($\phi1$) and the source of the switching transistor (M1, M3, . . . ) of the respective voltage gain circuit stage (S1, S3, . . . ). The capacitor (C2, C4, . . . ) of even ones (S2, S4, . . . ) of the voltage gain circuit stages (S1, S2, . . . , Sn) is connected electrically across the second clock ($\phi2$) and the source of the switching transistor (M2, M4, . . . ) of the respective voltage gain circuit stage (S2, S4, . . . ).

The output circuit stage (Sout) has an output transistor (Mout) which has a drain connected electrically to the source of the switching transistor (Mn) of a last one (Sn) of the voltage gain circuit stages (S1, S2, . . . , Sn), a source serving as an output terminal (Vout) of the charge pumping circuit, and a gate connected electrically to the drain of the output transistor (Mout). The output circuit stage (Sout) further has an output capacitor (Cout) which is connected electrically across the source of the output transistor (Mout) and the first clock ($\phi1$) when the total number of the voltage gain circuit stages (S1, S2, . . . , Sn) is an even number and which is connected electrically across the source of the output transistor (Mout) and the second clock ($\phi2$) when the total number of the voltage gain circuit stages (S1, S2, . . . , Sn) is an odd number.

In operation, assuming that the total number of the voltage gain circuit stages (S1, S2, . . . , Sn) is an even number, since the control transistor (Mc) is connected as a diode, the first voltage gain circuit stage (S1) will output a voltage which has a value approximately equal to the difference between the voltage level of the power source (Vin) and the threshold voltage of the control transistor (Mc), thereby charging the capacitor (C1). When the first clock ($\phi1$) is low and the second clock ($\phi2$) is high, the even ones (S2, . . . ) of the voltage gain circuit stages (S1, S2, . . . , Sn) will output a higher voltage which drives the switching transistor (M1, M3, . . . ) of the odd ones (S1, S3, . . . ) of the voltage gain circuit stages (S1, S2, . . . , Sn) and the output transistor (Mout) of the output circuit stage (Sout). At this time, the source voltage of the switching transistor (M1, M3, . . . ) of the odd ones (S1, S3, . . . ) of the voltage gain circuit stages (S1, S2, . . . , Sn) and the source voltage of the output transistor (Mout) of the output circuit stage (Sout) are relatively lower than the gate driving voltage so as to force the switching transistor (M1, M3, . . . ) of the odd ones (S1, S3, . . . ) of the voltage gain circuit stages (S1, S2, . . . , Sn) to operate in the ohmic region. It should be noted that the output transistor (Mout) of the output circuit stage (Sout) operates in the saturation region. Therefore, the switching transistor (M1, M3, . . . ) of the odd ones (S1, S3, . . . ) of the voltage gain circuit stages (S1, S2, . . . , Sn) and the output transistor (Mout) of the output circuit stage (Sout) are turned on so as to couple the high voltage of the capacitor (C2, . . . ) of the even ones (S2, . . . ) of the voltage gain circuit stages (S1, S2, . . . , Sn) to the source of the switching transistor (M3, . . . ) of an immediately succeeding one (S3, . . . ) of the voltage gain circuit stages (S2, . . . , Sn) and to the source of the output transistor (Mout) of the output circuit stage (Sout) in order to charge the capacitor (C3, . . . ) of the immediately succeeding one (S3, . . . ) of the voltage gain circuit stages (S1, S2, . . . , Sn) and the output capacitor (Cout) of the output circuit stage (Sout).

When the first clock ($\phi1$) is high and the second clock ($\phi2$) is low, the voltage stored previously in the capacitor (C1, C3, . . . ) of the odd ones (S1, S3, . . . ) of the voltage gain circuit stages (S1, S2, . . . , Sn) is coupled with the voltage provided by the first clock ($\phi1$) so as to turn on the switching transistor (M2, . . . ) of the even ones (S2, . . . ) of the voltage gain circuit stages (S1, S2, . . . , Sn), thereby transferring the high voltage which results from coupling of the voltage stored previously in the capacitor (C1, C3, . . . ) of the odd ones (S1, S3, . . . ) of the voltage gain circuit stages (S1, S2, . . . , Sn) with the voltage provided by the first clock ($\phi1$) to the source of the switching transistor (M2, . . . ) of the immediately succeeding one (S2, . . . ) of the voltage gain circuit stages (S1, S2, . . . , Sn) and to the source of the output transistor (Mout) of the output circuit stage (Sout).

Figure 7:
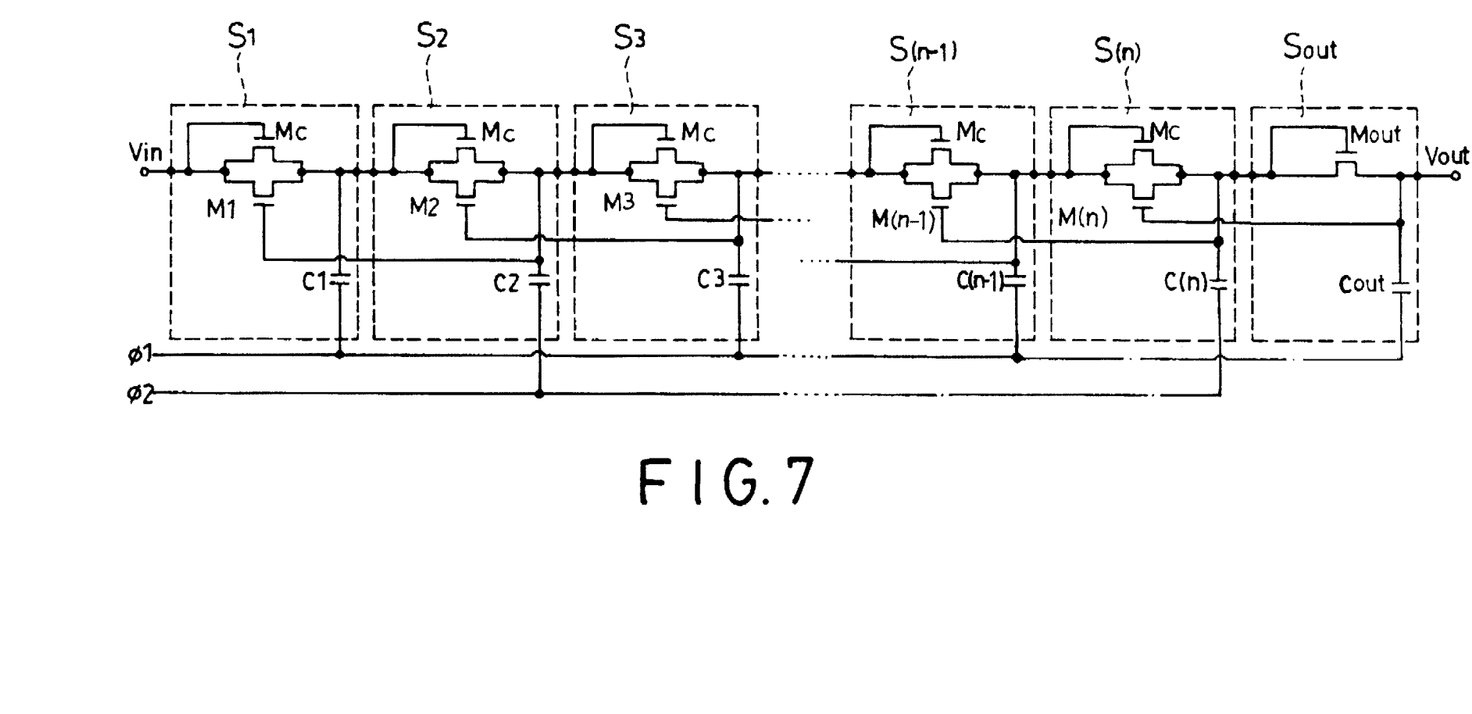
FIG. 7 is a schematic circuit diagram of a second preferred embodiment of a charge pumping circuit according to the present invention.

Referring now to FIG. 7, the second preferred embodiment of a charge pumping circuit according to the present invention is shown. In this embodiment, each of the voltage gain circuit stages (S1, S2, . . . , Sn) further has a control transistor (Mc) with a drain connected electrically to the drain of the switching transistor (M1, M2, . . . , Mn) thereof, a source connected electrically to the source of the switching transistor (M1, M2, . . . , Mn) thereof, and a gate connected electrically to the drain of the control transistor (Mc) of the same voltage gain circuit stage (S1, S2, . . . , Sn). Thus, the control transistors (Mc) are connected as diodes. It should be noted that, in the present embodiment, a large enough voltage is applied to the gate of the switching transistor (M1, M2, . . . , Mn) of each of the voltage gain circuit stages (S1, S2, . . . , Sn) so as to prevent lowering of the voltage gain among the latter voltage gain circuit stages due to the diode threshold effect described beforehand.

It is noted that, in the first and second preferred embodiments, current feedback occurs due to an inability to completely turn off the switching transistors (M1, M2, . . . , Mn) in the voltage gain circuit stages, thereby affecting the voltage gain of the voltage generator.

Figure 8:
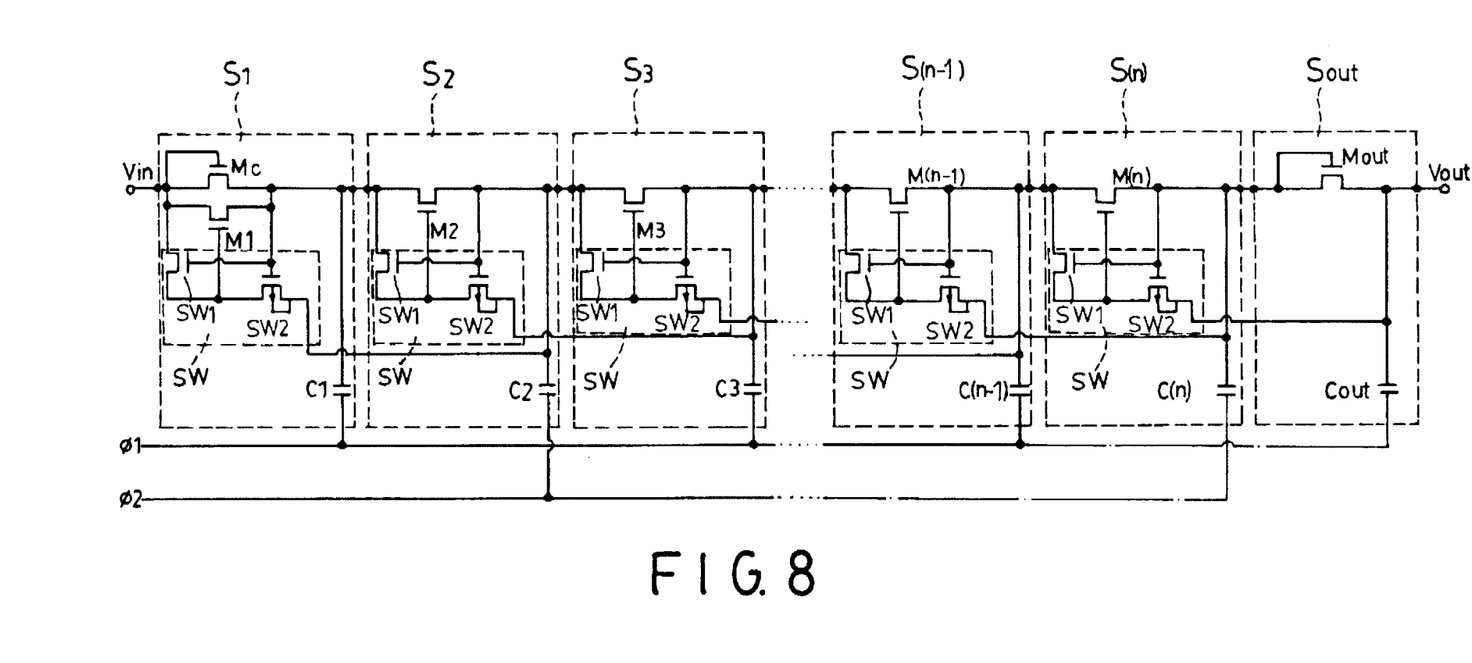
FIG. 8 is a schematic circuit diagram of a third preferred embodiment of a charge pumping circuit according to the present invention.

Referring to FIG. 8, a third preferred embodiment is proposed to overcome the above drawback. Unlike the first preferred embodiment of the present invention, each of the voltage gain circuit stages (S1, S2, . . . , Sn) further has a switching unit (SW) for interconnecting the switching transistor (M1, M2, . . . , Mn) thereof and the source of the switching transistor (M2, . . . , Mn) of an immediately succeeding one of the voltage gain circuit stages (S2, . . . , Sn). The switching unit (SW) of each of the voltage gain circuit stages (S1, S2, . . . , Sn) includes a first switching transistor (SW1) having a source connected electrically to the drain of the switching transistor (M1, M2, . . . , Mn), a drain connected electrically to the gate of the switching transistor (M1, M2, . . . , Mn), and a gate connected electrically to the source of the switching transistor (M1, M2, . . . , Mn), and a second switching transistor (SW2) having a drain connected electrically to the gate of the switching transistor (M1, M2, . . . , Mn), a gate connected electrically to the source of the switching transistor (M1, M2, . . . , Mn), and a source connected electrically to the source of the switching transistor (M2, . . . , Mn) of an immediately succeeding one of the voltage gain circuit stages (S2, . . . , Sn). The second switching transistor (SW2) of the last one (Sn) of the voltage gain circuit stages (S1, S2, . . . , Sn) is connected electrically to the source of the output transistor (Mout) of the output circuit stage (Sout). Preferably, the first switching transistors (SW1) are NMOS transistors, while the second switching transistors (SW2) are PMOS transistors.

When the first clock ($\phi1$) is high and the second clock ($\phi2$) is low, the capacitor (C1, C3, . . . ) of the odd ones (S1, S3, . . . ) of the voltage gain circuit stages (S1, S2, . . . , Sn) couples a high voltage at the source of the switching transistor (M1, M3, . . . ) of the respective voltage gain circuit stage (S1, S3, . . . ) so as to turn on the first switching transistor (SW1) and to turn off the second switching transistor (SW2) of the respective voltage gain circuit stage (S1, S3, . . . ). At this time, the switching transistor (M1, M3, . . .) of the odd ones (S1, S3, . . . ) of the voltage gain circuit stages (S1, S2, . . . , Sn) is connected as a diode so as to prevent current feedback to the drain thereof. When the first clock ($\phi1$) is low and the second clock ($\phi2$) is high, the first switching transistor (SW1) of the odd ones (S1, S3, . . . ) of the voltage gain circuit stages (S1, S2, . . . , Sn) is turned off and the second switching transistor (SW2) of the same is turned on. At this time, the gate of the switching transistor (M1, M3, . . . ) of the odd ones (S1, S3, . . . ) of the voltage gain circuit stages (S1, S2, . . . , Sn) is connected electrically to the source of the switching transistor (M2, . . . ) of even ones (S2, . . . ) of the voltage gain circuit stages (S1, S2, . . . , Sn). When the second clock ($\phi2$) is high and the first clock ($\phi1$) is low, the high voltage at the drain of the switching transistor (M1, M3, . . . ) of the odd ones (S1, S3, . . . ) of the voltage gain circuit stages (S1, S2, . . . , Sn) is coupled to the source of the same and the high voltage at the drain of the output transistor (Mout) of the output circuit stage (Sout) is coupled to the source of the same.

Because of the provision of the switching unit (SW), turning off of the switching transistors (M1, M2, . . . , Mn) can be ensured, thereby overcoming the drawback of the previous embodiment.

Figure 9:
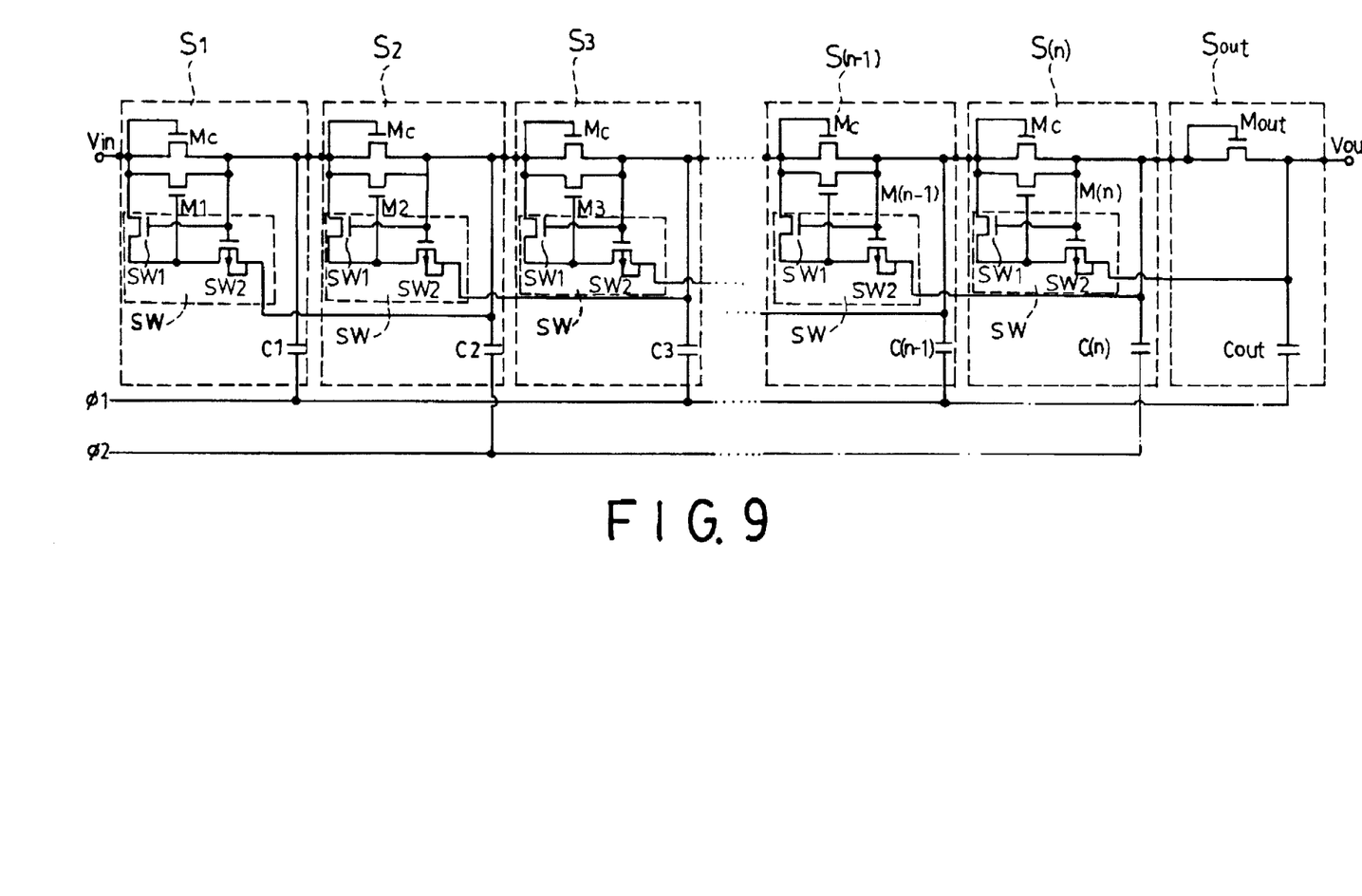
FIG. 9 is a schematic circuit diagram of a fourth preferred embodiment of a charge pumping circuit according to the present invention.

Referring now to FIG. 9, the fourth preferred embodiment is shown. Unlike the third preferred embodiment, each of the voltage gain circuit stages (S1, S2, . . . , Sn) further has a control transistor (Mc) with a drain connected electrically to the drain of the switching transistor (M1, M2, . . . , Mn) thereof, a source connected electrically to the source of the switching transistor (M1, M2, . . . , Mn) thereof, and a gate connected electrically to the drain of the control transistor (Mc) of the same voltage gain circuit stage (S1, S2, . . . , Sn). As with the second embodiment, a large enough voltage can be applied to the gate of the switching transistor (M1, M2, . . . , Mn) of each of the voltage gain circuit stages (S1, S2, . . . , Sn) so as to prevent lowering of the voltage gain among the latter voltage gain circuit stages due to the diode threshold effect described beforehand.

Figure 10:
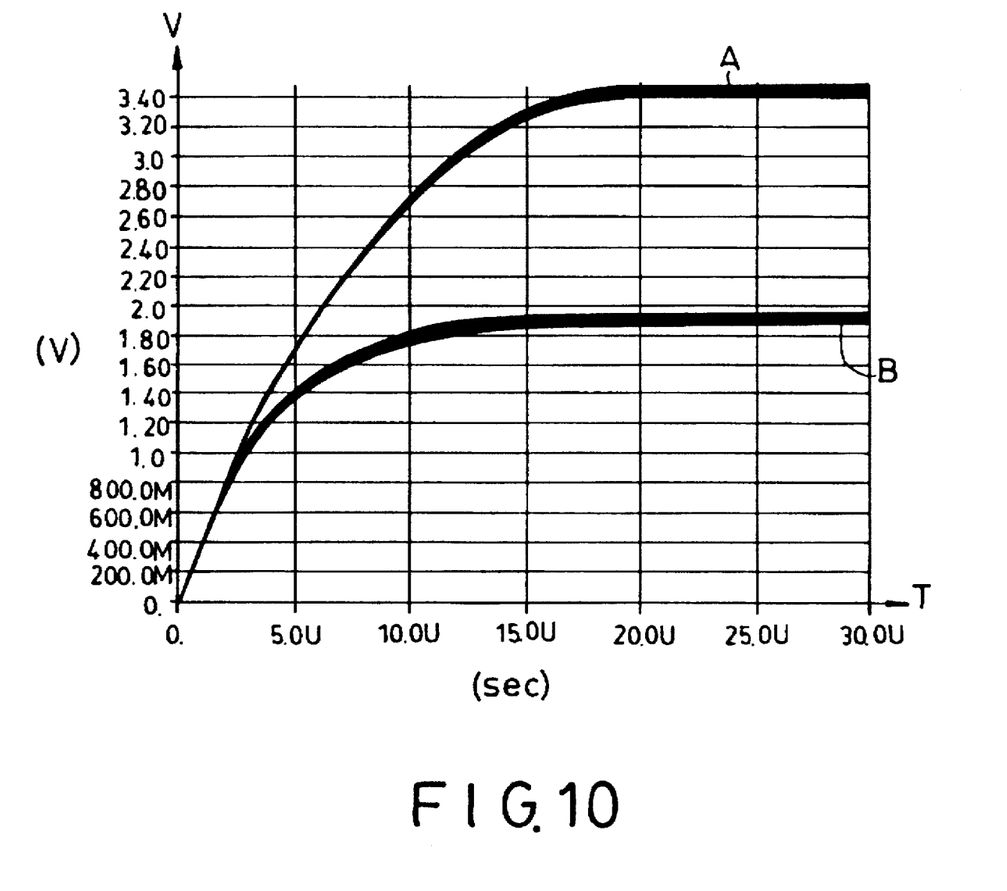
FIG. 10 is a graph showing the relationship among the voltage generated by the conventional charge pumping circuit of FIG. 1, the voltage generated by the first preferred embodiment and time.

Referring now to FIG. 10, a graph showing the relationship among the voltage generated by the conventional charge pumping circuit of FIG. 1, the voltage generated by the first preferred embodiment, and time is obtained with the use of a SPICE simulation program. In the graph, curve A is a plot of the output of the first preferred embodiment VS. time, while curve B is a plot of the output of the conventional charge pumping circuit of FIG. 1 VS. time. The circuit conditions are as follows:

1. There are five circuit stages (including the output stage) for each of the conventional charge pumping circuit shown in FIG. 1 and the charge pumping circuit of the first preferred embodiment.
2. The load current is 10 µA.
3. The voltage of the power source (Vin) is 1.2V.

From the graph, it is clear that, after the circuits have been activated for 15 microseconds, the output of the first preferred embodiment is nearly 3.4V. However, the output of the conventional charge pumping circuit has yet to reach 2.0V. Afterwards, both the output of the first preferred embodiment and the output of the conventional charge pumping circuit become stable. Therefore, the charge pumping circuit of the first preferred embodiment has a higher voltage gain as compared to the prior art of FIG. 1 and requires a fewer number of circuit stages in order to obtain a predetermined voltage gain.

Figure 11:
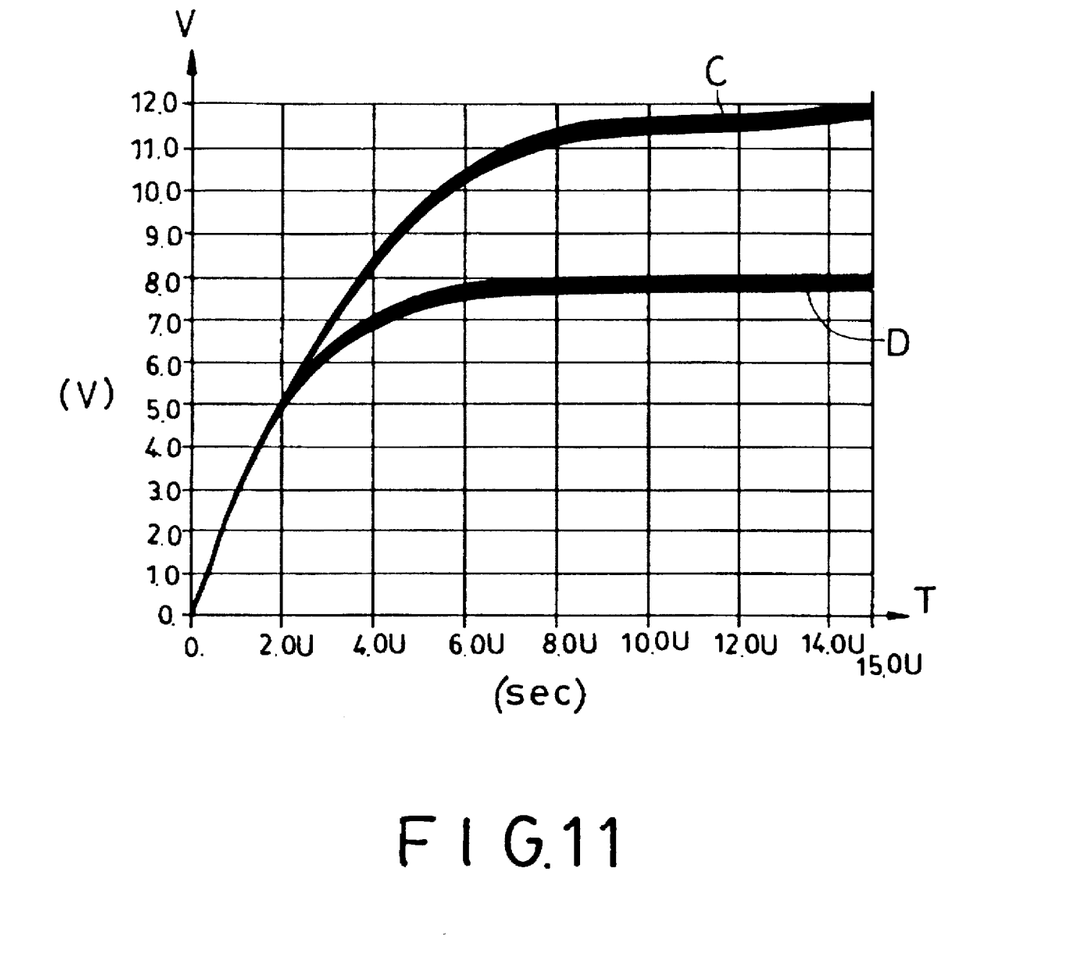
FIG. 11 is a graph showing the relationship among the voltage generated by the conventional charge pumping circuit of FIG. 3, the voltage generated by the third preferred embodiment and time.

Referring now to FIG. 11, a graph showing the relationship among the voltage generated by the conventional charge pumping circuit of FIG. 3, the voltage generated by the third preferred embodiment, and time is obtained with the use of a SPICE simulation program. In this graph, curve C plots the output of the third preferred embodiment VS. time, while curve D plots the output of the conventional charge pumping circuit of FIG. 3 VS. time. The circuit conditions are as follows:

1. There are seven circuit stages (including the output stage) for each of the conventional charge pumping circuit shown in FIG. 3 and the charge pumping circuit of the third preferred embodiment.
2. The load current is 700 μA.
3. The voltage of the power source (Vin) is 3.3V.

From the graph, it is clear that, after the circuits have been activated for 8 microseconds, the output of the third preferred embodiment already exceeds 11V. However, the output of the conventional charge pumping circuit is only about 8V. After 15 microseconds, both the output of the third preferred embodiment and the output of the conventional charge pumping circuit become stable. Therefore, the charge pumping circuit of the third preferred embodiment has a higher voltage gain as compared to the prior art of FIG. 3 and requires a fewer number of circuits stages in order to obtain a predetermined voltage gain.

Figure 12:
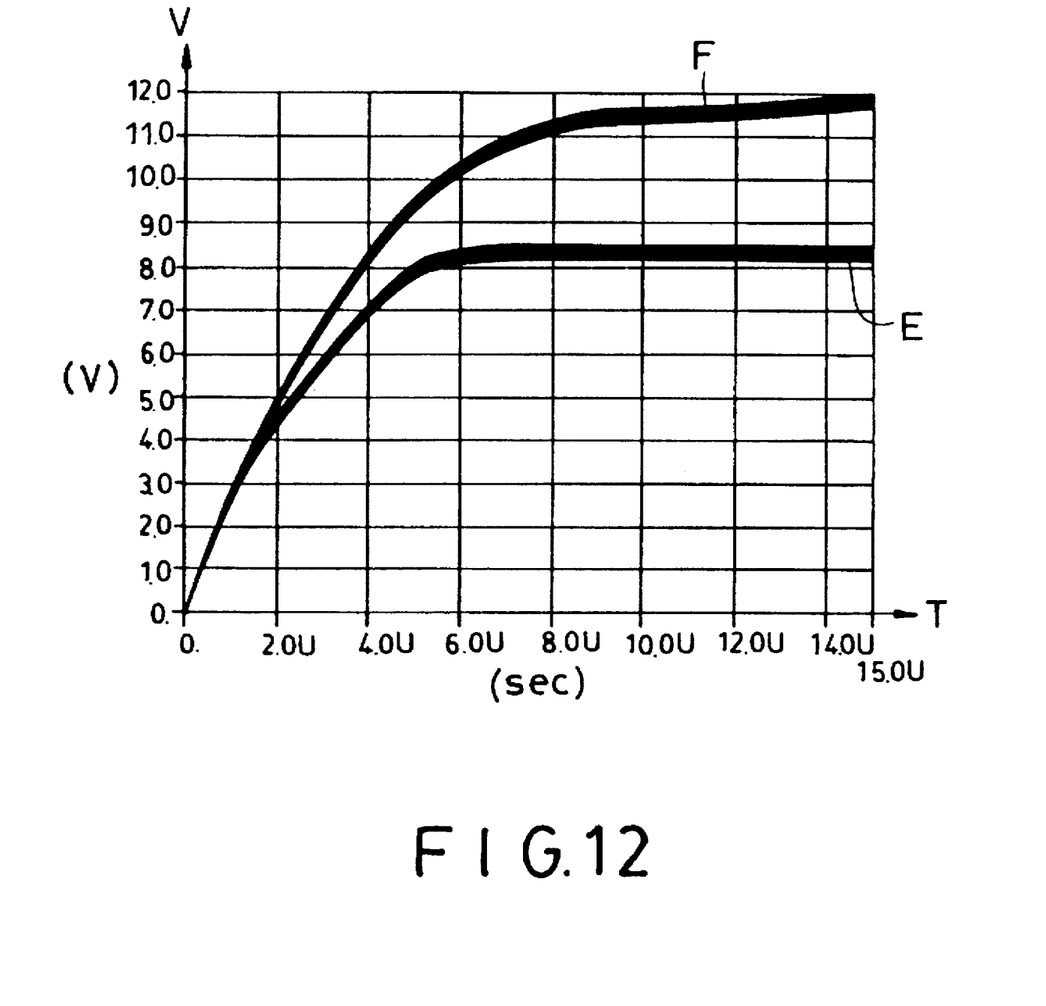
FIG. 12 is a graph showing the relationship among the voltages generated by the first and third preferred embodiments and time.

Referring now to FIG. 12, a graph showing the relationship among the voltage generated by the first preferred embodiment, the voltage generated by the third preferred embodiments, and time is obtained with the use of a SPICE simulation program. In this graph, curve E plots the output of the first preferred embodiment VS. time, while curve F plots the output of the third preferred embodiment VS. time. The circuit conditions are as follows:

1. There are seven circuit stages (including the output stage) for each of the first and third preferred embodiments.
2. The load current is 700 μA.
3. The voltage of the power source (Vin) is 3.3V.

From the graph, it is clear that, after the circuits have been activated for 6 microseconds, the output of the first preferred embodiment exceeds 8V, while that of the third preferred embodiment exceeds 10V. After 15 microseconds, both the output of the first preferred embodiment and the output of the third preferred embodiment become stable. Therefore, a higher voltage gain can be obtained with the use of the third preferred embodiment, and a fewer number of circuit stages is required in order to obtain a predetermined voltage gain.

Accordingly, the charge pumping circuit of the present invention has the following advantages:

1. A better current loading capability is obtained under the same clock frequency.
2. Fewer circuit stages are needed to obtain a desired voltage gain.
3. The highest voltage output that can be generated by the present invention is greater than that which can be generated by the prior art.
4. Only two clocks are needed in the present invention.

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

We claim:

1. A charge pumping circuit having an input terminal adapted to be connected electrically to a power source, and an output terminal, said charge pumping circuit comprising:

a first clock;

a second clock, said first and second clocks being out of phase;

a plurality of cascaded voltage gain circuit stages, each having an switching transistor which has a drain, a source connected electrically to said drain of said switching transistor of an immediately succeeding one of said voltage gain circuit stages, and a gate connected electrically to said source of said switching transistor of said immediately succeeding one of said voltage gain circuit stages, said drain of said switching transistor of a first one of said voltage gain circuit stages serving as the input terminal of the charge pumping circuit, each of said voltage gain circuit stages further having a capacitor, said capacitor of odd ones of said voltage gain circuit stages being connected electrically across said first clock and said source of said switching transistor of the respective said voltage gain circuit stage, said capacitor of even ones of said voltage gain circuit stages being connected electrically across said second clock and said source of said switching transistor of the respective said voltage gain circuit stage; and an output circuit stage having an output transistor which has a drain connected electrically to said source of said switching transistor of a last one of said voltage gain circuit stages, a source serving as the output terminal of the charge pumping circuit, and a gate connected electrically to said drain of said output transistor, said output circuit stage further having an output capacitor which is connected electrically across said source of said output transistor and said first clock when total number of said voltage gain circuit stages is an even number and which is connected electrically across said source of said output transistor and said second clock when total number of said voltage gain circuit stages is an odd number.

2. A charge pumping circuit as claimed in claim 1, wherein said first one of said voltage gain circuit stages further has a control transistor with a drain connected electrically to said drain of said switching transistor thereof, a source connected electrically to said source of said switching transistor thereof, and a gate connected electrically to said drain of said control transistor.

3. A charge pumping circuit as claimed in claim 1, wherein each of said voltage gain circuit stages further has a control transistor with a drain connected electrically to said drain of said switching transistor thereof, a source connected electrically to said source of said switching transistor thereof, and a gate connected electrically to said drain of said control transistor.

4. A charge pumping circuit as claimed in claim 1, wherein each of said voltage gain circuit stages further has a switching unit for interconnecting said switching transistor thereof and said source of said switching transistor of an immediately succeeding one of said voltage gain circuit stages.

5. A charge pumping circuit as claimed in claim 4, wherein said switching unit of each of said voltage gain circuit stages includes:

a first switching transistor having a source connected electrically to said drain of said switching transistor of said each of said voltage gain circuit stages, a drain connected electrically to said gate of said switching transistor of said each of said voltage gain circuit stages, and a gate connected electrically to said source of said switching transistor of said each of said voltage gain circuit stages; and a second switching transistor having a drain connected electrically to said gate of said switching transistor of said each of said voltage gain circuit stages, a gate connected electrically to said source of said switching transistor of said each of said voltage gain circuit stages, and a source connected electrically to said source of said switching transistor of an immediately succeeding one of said voltage gain circuit stages.

6. A charge pumping circuit as claimed in claim 5, wherein said first one of said voltage gain circuit stages further has a control transistor with a drain connected electrically to said drain of said switching transistor thereof, a source connected electrically to said source of said switching transistor thereof, and a gate connected electrically to said drain of said control transistor.

7. A charge pumping circuit as claimed in claim 5, wherein each of said voltage gain circuit stages further has a control transistor with a drain connected electrically to said drain of said switching transistor thereof, a source connected electrically to said source of said switching transistor thereof, and a gate connected electrically to said drain of said control transistor.

8. A charge pumping circuit as claimed in claim 5, wherein said first switching transistor of said switching unit of each of said voltage gain circuit stages is an NMOS transistor, while said second switching transistor of said switching unit of each of said voltage gain circuit stages is a PMOS transistor.

* * * * *